United States Patent [19]

Espin

[11] Patent Number: 4,496,999
[45] Date of Patent: Jan. 29, 1985

[54] VIDEO TAPE CASSETTE AND DEVICE THEREFOR

[76] Inventor: Mario W. Espin, 2301 Winthrop Ave., Charlotte, N.C. 28203

[21] Appl. No.: 416,568

[22] Filed: Sep. 10, 1982

[51] Int. Cl.³ .............................................. G11B 15/04
[52] U.S. Cl. ...................................................... 360/60
[58] Field of Search ............................ 360/60, 137, 93

[56] References Cited

U.S. PATENT DOCUMENTS 3,828,363  8/1974  Somers ................................... 360/60
4,041,537  8/1977  Kishi ...................................... 360/60
4,053,935  10/1977  Shibi ..................................... 360/60

Primary Examiner—Vincent P. Canney
Attorney, Agent, or Firm—Richards, Shefte & Pinckney

[57] ABSTRACT

A spring clip for attachment to a conventional video tape cassette of the type having an antirecording opening in the cassette housing, the clip being adapted to resiliently engage the housing for sliding movement into and out of covering relation with the antirecording opening respectively to prevent and permit its antirecording operation.

4 Claims, 4 Drawing Figures

4,496,999

VIDEO TAPE CASSETTE AND DEVICE THEREFOR

BACKGROUND OF THE INVENTION

The present invention relates to video tape cassettes and to devices for use in connection therewith.

In recent years, video tape recording and playback equipment particularly designed for non-commercial, in-home use has become available on a relatively broad scale and has come into widespread use due in large part to the development and refinement of a convenient cartridge-type housing for video recording tape in which a selected length of video tape is permanently stored on reels for recording and playback use, characteristically referred to as video tape cassettes, and to the development and refinement of compatible machines adapted to accept such tape cassettes both for the recording of video signals on the tape thereof and for the viewing of video signals previously recorded thereon. One potential disadvantage of the dual function of such machines for recording and playback is the possibility of inadvertently recording a new video signal onto the tape of a cassette over a previously recorded signal thereon.

As a safeguard against such overrecording occurring unintentionally, the housing of a conventional tape cassette is provided with a small opening therein and conventional recording and playback machines are provided with a sensing arrangement adapted to render the machine inoperative in its record mode when such opening is sensed but to permit operation in the record mode when no opening is sensed. Accordingly, blank tape cassettes are constructed with a removable tab within the antirecording opening thereof to permit initial use of the cassettes for recording of video signals on the tape thereof and to permit the permanent storage for playback purposes of signals recorded thereon upon the removal of the tab. Conversely, tape cassettes initially pre-recorded by the producer have no tab or other obstruction in the antirecording opening, the tab being removed following the completion of recording as part of the production process. While the advantages provided by this manner of construction of tape cassettes and their compatible playing and recording machinery is readily apparent, certain disadvantages therein exist in that the removal of the tab in the antirecording opening essentially renders the tape cassette unusable thereafter for recording. Thus, if one ever desires to overrecord on a tape cassette the tab of which has been removed, it is necessary to circumvent in some way the antirecording opening such as, for example, by placing ordinary adhesive tape over the opening, the usual manner in which this result is achieved.

In contrast, the present invention provides a device which may be readily attached to existing tape cassettes or may be incorporated in new tape cassettes in the manufacture thereof and is adapted to be movable on the cassette, rather than removable therefrom, to selectively close and open the antirecording opening thereof as is desired.

SUMMARY OF THE INVENTION

The present invention is applicable to video tape cassettes of the type having a tape housing containing a supply of video recording tape and an antirecording opening formed in the housing operable when the cassette is operatively positioned in a tape recording apparatus to prevent overrecording thereby onto the tape. According to one aspect of the present invention, a device is provided for use with such a tape cassette, the device being adapted for attachment to the housing to be selectively movable into and out of a position closing the antirecording opening respectively to prevent and permit its antirecording operation. According to another aspect of the present invention, an improved tape cassette is provided having such a movable arrangement for selectively closing the antirecording opening. In this manner, the present invention permits the video tape cassette to be employed selectively for recording on the tape thereof as desired or for playback of material prerecorded on the tape without danger of inadvertent overrecording.

In the preferred embodiment, the closing device is a three-sided spring clip configured in substantial correspondence to the exterior box-shaped configuration of the cassette housing such that the device is adapted to resiliently engage the housing overlying the side thereof in which the antirecording opening is formed and two adjacent sides. The three sides of the spring clip are relatively oriented in a relaxed condition at slightly smaller relative angles than the corresponding sides of the housing such that the spring clip is snugly engaged about the housing. One of the housing sides engaged by the spring clip includes a longitudinal groove extending substantiall parallel to the side in which the antirecording opening is formed, the spring clip including a leg in the corresponding side thereof which leg engages slidably in the groove for guiding movement of the spring clip.

DESCRIPTION OF THE PREFERRED EMBODIMENT

Figure 1:
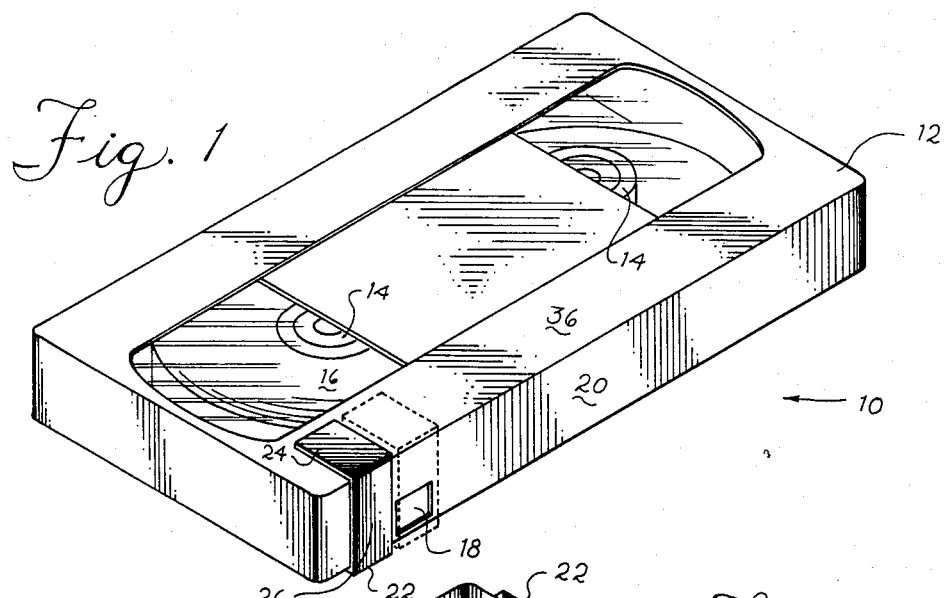
FIG. 1 is a top perspective view of a video tape cassette incorporating the closing arrangement of the present invention.
Figure 2:
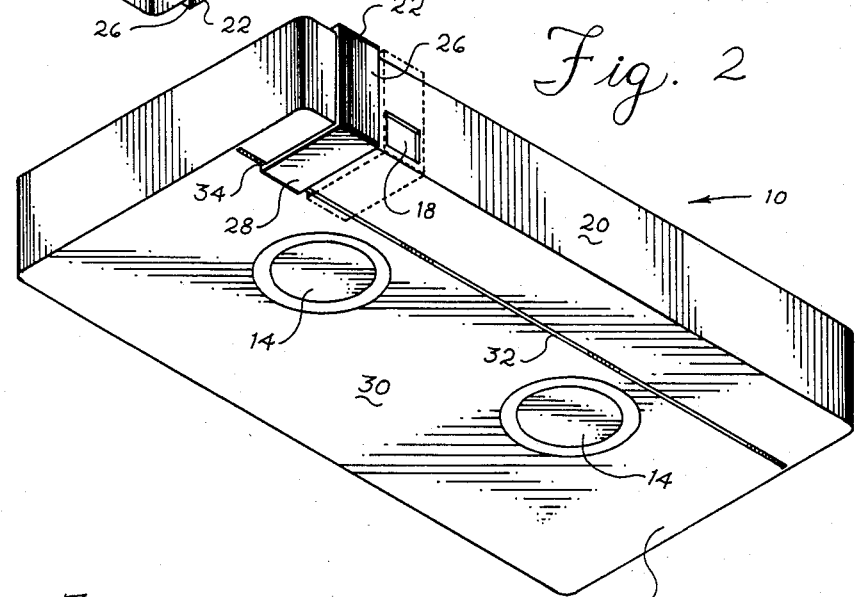
FIG. 2 is a bottom view thereof.

Referring now to the accompanying drawings, the present invention is illustrated as preferably embodied for use with a conventional video tape cassette, indicated generally at 10 in FIGS. 1 and 2, of the type commonly referred to as VHS. As is known, video tape cassettes have evolved into four conventional standardized constructions and operational formats, known respectively as VHS, BETA, UMATIC and VHS-C, and such cassettes, as well as the video tape recording and playing machines compatible therewith, are typically identified according to their construction and operational format. Video tape cassettes of each type are of generally comparable construction insofar as the concepts of the present invention are concerned in that cassettes of each type include a tape housing and a machine compatible antirecording opening formed therein. Accordingly, the principles of the present invention are considered to be fundamentally applicable to video tape cassettes of all formats. For convenience, the present invention is herein described as preferably embodied in cassettes of the VHS format, but those persons skilled in this art will readily recognize the applicability of the invention to BETA, UMATIC and VHS-C format cassettes as well.

With reference to FIGS. 1 and 2, the cassette 10 includes a housing 12 of a box-shaped, rectangular hexahedron construction. Two reels 14 carrying a predetermined length of video tape 16 are rotatably mounted within the housing 12 for operative movement from one reel to the other upon insertion of the cassette in a compatible recording and playing apparatus (not shown). A relatively small, square opening 18 is formed exteriorly in one upright side surface 20 of the cassette housing 12, the opening 18 being operable when the cassette 10 is operatively positioned in a compatible recording and playing machine to actuate a sensing arrangement therein to prevent recording on the tape 16, all as is conventional and has hereinabove been previously indicated. Such cassettes are manufactured with a removable tab (not shown) disposed in the opening 18 to obstruct it and thereby to permit initial recording on the tape 16, after which the tab is removed to safeguard against subsequent overrecording.

Figure 3:
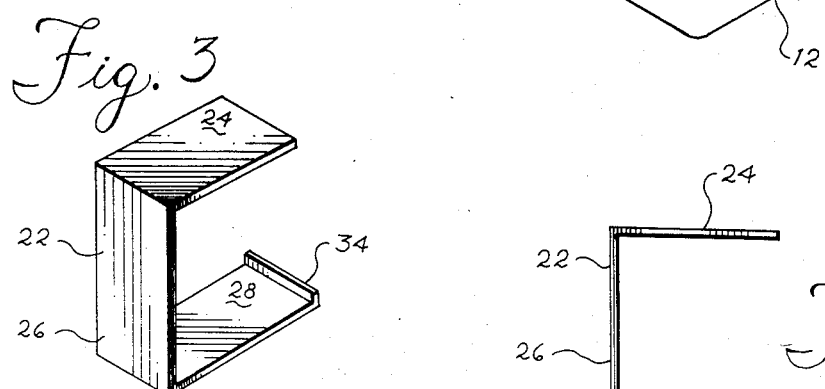
FIG. 3 is a perspective view of the attachable device of the present invention.
Figure 4:
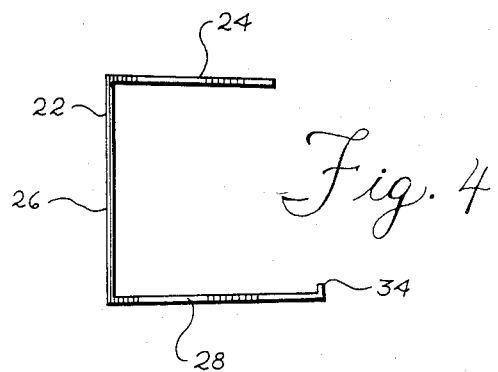
FIG. 4 is a side view thereof.

The present invention provides a device 22 which is adapted to be securely attached to the cassette housing 12 overlying the side surface 20 thereof for sliding movement into and out of covering relation with the antirecording opening 18. As best seen in FIGS. 3 and 4, the device 22 is constructed as a spring clip of a length of band material which may be of any resilient material such as spring steel or other metal or plastic. The spring clip 22 is appropriately configured by bending or another conventional manner of fabrication to have three sides 24, 26, 28 substantially conforming to the exterior configuration of the cassette housing 12 at its side surface 20 and particularly at the antirecording opening 18 therein. Thus, the intermediate side 26 of the spring clip 22 is of substantially the same or a slightly greater longitudinal dimension than the vertical height of the side surface 20, and the other sides 24, 28 of the spring clip 22 extend respectively from the opposite ends of the side 26 generally perpendicularly thereto, preferably at respective angles relative to the side 26 slightly less than ninety degrees, e.g., between eighty-five and ninety degrees, whereby the sides 24, 28 extend slightly toward one another. The transverse dimension of the spring clip 22 is preferably sufficient for completely covering the antirecording opening 18. Conventional VHS-format cassettes are characteristically provided in the bottom face 30 thereof with a linear groove 32 extending parallel to the side surface 20 (See FIG. 2) and, for enhanced security of engagement of the spring clip 22 on the cassette 10, the side 28 is of substantially the same dimension as the transverse width of the bottom face 30 between its groove 32 and its edge intersecting the side surface 20 and a small upstanding leg 34 is formed at the outward end of the side 28.

The operation of the spring clip 22 will accordingly be understood. Initially, the spring clip 22 is attached to the cassette housing 12 by orienting the spring clip 22 adjacent the side surface 20 of the housing 12 with the outward ends of the sides 24, 28 of the spring clip 22 at the respective edges of the side surface 20 with the top and bottom faces 36, 30 of the housing 12, and manipulating the spring clip 22 to cause the sides 24 28 thereof to slide respectively over and under the top and bottom housing faces 36, 30 until the side 26 of the spring clip 22 abuts the side surface 20 of the housing 12 and the upstanding leg 34 of the side 28 of the spring clip 22 engages in the groove 32 of the bottom housing face 30.

As will be understood, the sides 24, 28 accordingly are spread slightly apart from their relaxed dispositions in this attachment process, the resiliency of the spring clip 22 biasing the sides 24,28 toward their relaxed dispositions, whereby the spring clip 22 grippingly engages the housing 12 in a secure friction fit. With the spring clip 22 thus operatively attached to the cassette housing 12, the spring clip 22 is disposed to be manually moved slidably along the side housing surface 20 and the adjacent top and bottom housing faces 36, 30, the upstanding leg 34 sliding in the groove 32 to guide and stabilize the movement of the spring clip 22. In this manner, the spring clip 22 may be selectively slid into and out of a position in which the side 26 covers the antirecording opening 18. Accordingly, when it is desired to employ the cassette 10 for recording on its video tape 16, the spring clip 22 is slid into covering relation with the antirecording opening 18 as illustrated in dotted lines in FIGS. 1 and 2, thus preventing any sensing of the opening 18 by the recording machine being used and thereby permitting the recording process to proceed. Following completion of the recording process, the spring clip 22 is slid to one side of the antirecording opening 18 to uncover it as illustrated in full lines in FIGS. 1 and 2, thus permitting sensing of the opening 18 by the recording machine during subsequent playing of the cassette 10 and thereby preventing overrecording onto the tape.

As those persons skilled in the art will readily appreciate, the present invention provides several significant advantages over conventional video tape cassettes. While conventional cassettes may be employed both for recording and playing as long as the tab disposed in the cassette's antirecording opening is in place and although the cassette may be safeguarded against overrecording on the tape thereof by removal of the tab, this conventional tab construction provides little flexibility to the user in that, when the tab is left in place, no safeguard against overrecording exists and, once the tab is removed, the option of re-recording on the tape is lost except by circumvention of the antirecording opening. The device 22 of the invention also performs the desired function of the tab but, in contrast thereto, is adapted to be a movable permanent component of the cassette rather than a removable disposable component thereof whereby the device 22 may be moved as desired into and out of an operative, recording position and, most importantly, any material recorded on the cassette may always be safeguarded against recording thereover while at the same time retaining the option of subsequent recording usage of the cassette if desired. For existing conventional cassettes of the type provided with a tab in the antirecording opening or from which the tab has been removed, it is contemplated that the present device be used as an essentially permanent attachment to such cassettes to facilitate continued flexibility of use thereof to the owner. On the other hand, since the present device provides a functional alternative to the conventional tab-type construction of cassettes, it is contemplated that such tabs may be eliminated from conventional cassettes and the present device incorporated in the manufacture of cassettes as a permanent component of the housing thereof in replacement of the tab.

The present invention has been described in detail above for purposes of illustration only and is not intended to be limited by this description or otherwise to exclude any variation or equivalent arrangement that would be apparent from, or reasonably suggested by the foregoing disclosure to the skill of the art.

I claim:

1. In a video tape cassette of the type having a box-shaped tape housing containing a supply of video recording tape and an antirecording opening formed in one side of said housing operable when said cassette is operatively positioned in a tape recording apparatus to prevent overrecording thereby onto said tape, the improvement comprising a three-sided spring clip configured in substantial correspondence to the exterior configuration of said one side of said housing and two sides of said housing adjacent thereto with the three sides of said spring clip being relatively oriented in a relaxed condition at slightly smaller respective angles than the corresponding sides of said housing, said spring clip being snugly engaged resiliently on said one side and said two adjacent sides of said housing for sliding movement into and out of covering relation with said antirecording opening respectively to prevent and permit antirecording operation thereof, whereby said video tape cassette may be selectively employed for recording on said tape thereof as desired and for playback of material prerecorded on said tape thereof without danger of inadvertent overrecording.

2. The improvement in a video tape cassette according to claim 1 and characterized further in that one of said two housing sides includes a longitudinal groove extending substantially parallel to said first side and said spring clip includes a leg in the side thereof overlying said one housing side, said leg being engaged slidably in said groove for guiding movement of said spring clip.

3. A device for use with a video tape cassette of the type having a box-shaped tape housing containing a supply of video recording tape and an antirecording opening formed in one side of said housing operable when said cassette is operatively positioned in a cassette tape recording apparatus to prevent overrecording thereby onto said tape, said device comprising a three-sided spring clip configured in substantial correspondence to the exterior configuration of said one side of said housing and two sides of said housing adjacent thereto with the three sides of said spring clip being relatively oriented in a relaxed condition at slightly smaller respective angles than the corresponding sides of said housing, said spring clip being adapted to be snugly engaged resiliently on said one side and said two adjacent sides of said housing to be selectively slidable into and out of covering relation with said antirecording opening respectively to prevent and permit antirecording operation thereof, whereby said video tape cassette may be selectively employed for recording on said tape thereof as desired and for playback of material prerecorded on said tape thereof without danger of inadvertent overrecording.

4. The device of claim 3 and characterized further in that one of said two housing sides includes a longitudinal groove extending substantially parallel to said first side and said spring clip includes a leg in the side thereof overlying said one housing side, said leg being engaged slidably in said groove for guiding movement of said spring clip.

* * * * *